US006906759B2

(12) United States Patent
Funke

(10) Patent No.: US 6,906,759 B2
(45) Date of Patent: Jun. 14, 2005

(54) DEVICE AND METHOD FOR SUBFIELD CODING OF PICTURE DATA USING FIRST SUBFIELDS HAVING DIFFERENT ON-PERIODS AND SECOND SUBFIELDS HAVING IDENTICAL ON-PERIODS

(75) Inventor: Eric Peter Funke, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 488 days.

(21) Appl. No.: 10/015,831

(22) Filed: Nov. 30, 2001

(65) Prior Publication Data

US 2002/0093462 A1 Jul. 18, 2002

(30) Foreign Application Priority Data

Nov. 30, 2000 (EP) ........................................... 00204265

(51) Int. Cl.$^7$ ................................................. H04N 5/70
(52) U.S. Cl. ...................................... 348/801; 348/797
(58) Field of Search ................................ 348/797, 801; 345/63, 77–79, 82

(56) References Cited

U.S. PATENT DOCUMENTS

| | | | | | |
|---|---|---|---|---|---|
| 5,475,448 | A | * | 12/1995 | Saegusa | 348/797 |
| 5,798,743 | A | | 8/1998 | Bloom | 345/90 |
| 5,959,598 | A | | 9/1999 | McKnight | 345/90 |
| 6,100,863 | A | * | 8/2000 | Zhu | 345/89 |
| 6,115,011 | A | * | 9/2000 | Sano et al. | 345/64 |
| 6,236,380 | B1 | * | 5/2001 | Wani et al. | 345/60 |
| 6,650,373 | B2 | * | 11/2003 | Ono et al. | 348/673 |

* cited by examiner

*Primary Examiner*—Victor R. Kostak

(57) ABSTRACT

A device for subfield coding a large-screen display generates a digital value for a picture element of the display, and determines a first number and a second number of subfields of a predetermined total number of subfields from the digital value, for which determined subfields the picture element emits radiation. In order to improve the dynamic range while maintaining the maximally obtainable brightness, the first number of subfields each have a different on-period during which the picture element emits radiation, and the second number of each have a same on-period during which the picture element emits radiation.

18 Claims, 2 Drawing Sheets

DEVICE AND METHOD FOR SUBFIELD CODING OF PICTURE DATA USING FIRST SUBFIELDS HAVING DIFFERENT ON-PERIODS AND SECOND SUBFIELDS HAVING IDENTICAL ON-PERIODS

BACKGROUND OF THE INVENTION

The invention relates to a device for subfield coding as defined in the preamble of claim 1.

The invention also relates to a method of subfield coding as defined in the preamble of claim 8.

Such a device for subfield coding is used in large television displays and computer displays, which displays comprise a number of light sources arranged in a matrix. Such a display may comprise a plurality of LEDs or a plasma display panel.

In the known device, the subfield coding is applied to obtain a grey scale by means of pulse width modulation of the light-emitting diodes (LEDs) in the display. The known device comprises means for subdividing every field of an image signal to be displayed into 255 subfields and processing means arranged to program all picture elements of the display device to emit or not to emit light during that subfield. For LED displays, the brightness of the LEDs is dependent on the LED current and the on-period of the LEDs of the respective subfields. Accordingly, a picture element that should produce 1/256 of the maximum light output will only emit light during one subfield, and a picture element that should produce 10/256 of the maximum light output will emit light during ten subsequent subfields. A disadvantage of this subfield coding is that it provides only a small dynamic range which is not sufficient for typical applications of large television and monitor screens in, for example, open air or in relatively dark control rooms.

Another possibility is to increase the length of each subsequent subfield by a predetermined amount as is applied in, for example, plasma display panels. If, for example, every field of an image signal is subdivided into twelve subfields and the first subfield corresponds to 1/2048 of the maximum light output, the second subfield corresponds to 1/1024 of the light output and so on, so that a twelve-bit gray scale can be obtained. However, a disadvantage of this subfield coding reduces the maximally obtainable brightness of the display, because the light-emitting elements do not emit radiation for the maximally possible time in a subfield in order to display the maximum brightness.

BRIEF SUMMARY OF THE INVENTION

It is an object of the invention to provide a device for subfield coding which improves the dynamic range of a picture and maintains the maximally obtainable brightness of the image to be displayed. This object is achieved by a device according to the invention as defined in claim 1. In this device, the predetermined total number of subfields having a fixed duration is divided into a first number of subfields having a different period in which the picture element emits radiation, and a second number of subfields having a fixed period in which the picture element emits radiation. The first number of subfields is used to obtain a fine scale for the lower values of brightness of the picture element. The second number of subfields is used to obtain a linear scale for the higher values of brightness of the picture element.

For example, when the total number of subfields is 256, a binary order or an order defined by successive negative powers of two can be applied to define the lower values of brightness for the first ten subfields. The relative length of the on-period of the first sub-field is 2 to the power −10, the relative length of the second subfield is 2 to the power −9, and so on. The relative length of the $10^{th}$ period is then ½. The remaining 245 subfields have a fixed relative length of 1 and are used to obtain a linear scale for the higher values of brightness. The maximally obtainable brightness is thus hardly reduced. Applying this subfield coding in a display device improves the dynamic range of a large display so that it can operate under different ambient light conditions varying from low ambient brightness to high ambient brightness, while the maximally obtainable brightness of the device is maintained.

It is a further object of the invention to provide a method of subfield coding which improves the dynamic range of a picture and maintains the maximally obtainable brightness of the image to be displayed. This object is achieved by the method of subfield coding according to the invention as defined in claim 8.

Further advantageous embodiments of the subfield coding device according to the invention are defined in the dependent claims.

These and other aspects of the invention are apparent from and will be elucidated with reference to the embodiments described hereinafter. In the drawing:

DETAILED DESCRIPTION

Figure 1:
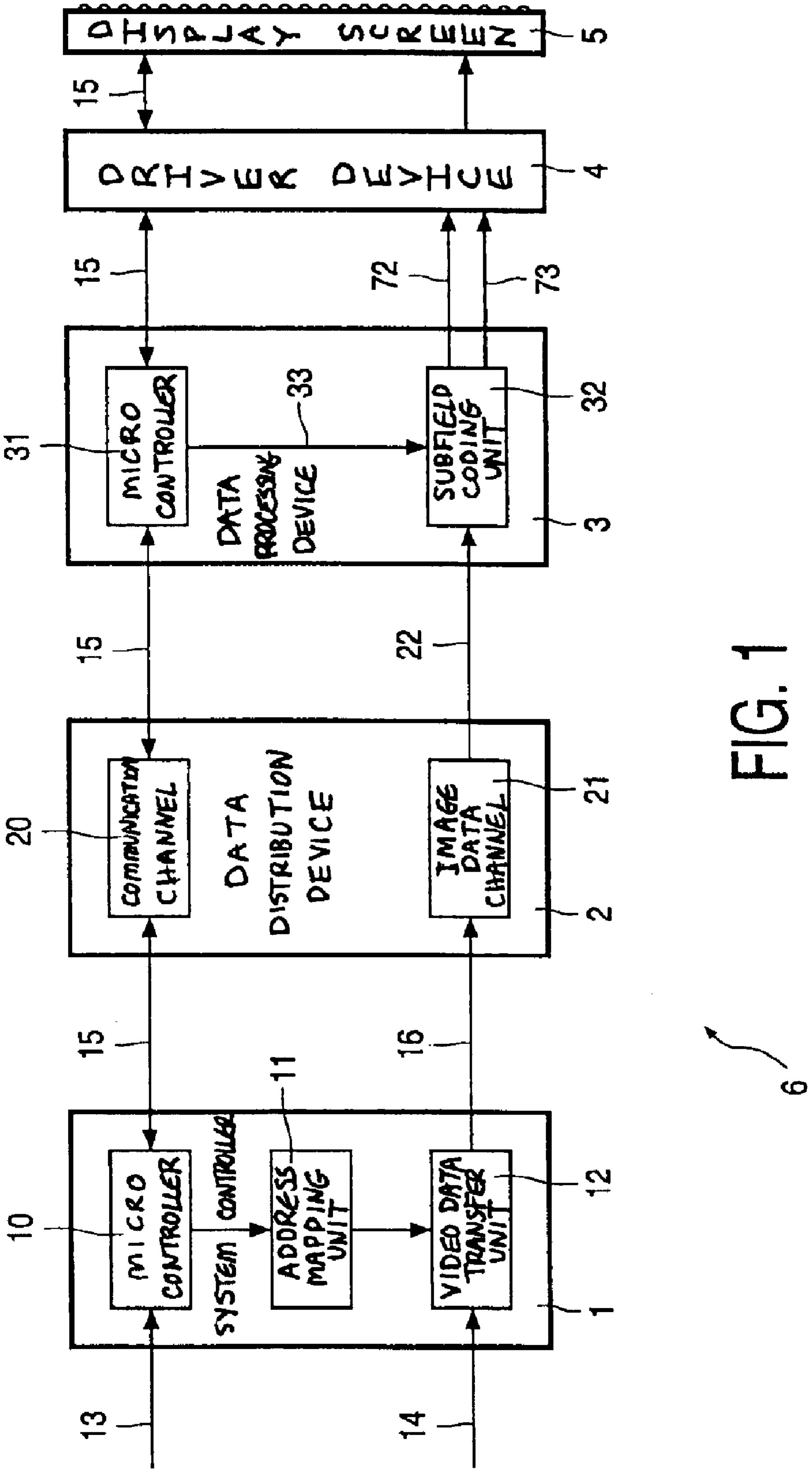
FIG. 1 shows a block diagram of a LED data display device.

FIG. 1 shows a block diagram of a LED data display device 6 comprising a system controller 1, a data distribution device 2, a data processing device 3, a driver device 4 and a display screen 5 comprising a plurality of LEDs arranged in a matrix. The system controller 1 preferably comprises a micro-controller 10 for controlling the display device, an address mapping unit 11 for generating addresses to store the video data and a video data transfer unit 12 for transferring video data to the data distribution device 2. Furthermore, the system controller 1 comprises two inputs, one input 13 being connected to the micro-controller 1 for sending and receiving control data and one input 14 being connected to the video data transfer unit for receiving digital video data from a digital video source, for example, a digital video recorder, a digital video player or a personal computer. The system controller 1 is connected to the data distribution device 2 via two buses 15,16. A control bus 15 is used for communicating control data to and from the data distribution device 2, and a data bus 16 is used for transferring digital video data to the data distribution device 2. The data distribution device 2 comprises a communication channel 20 for communicating control data from the system controller 1 to the data processing device 3 and an image data channel 21 for transferring video data to the data processing device 3. A number of data distribution devices 2 can be used in dependence upon the number of picture elements and the screen size of the display screen 5. Diagnostic and other data from the data distribution device 2 can also be transferred to the system controller 1 via the control bus 15. The data distribution device 2 is connected to the data processing device 3. The data distribution 2 device reformats the video data and distributes the video data to the data processing device 3. The data processing device 3 comprises a further micro-controller 31 and a subfield coding unit 32. The data processing device 3 is connected to the driver device 4 and generates a subfield-on signal 72 and an output-enable signal 73 to the driver device 4. The driver device 4 is connected to a portion of the display screen 5. The portion of display screen 5 comprises, for example, 16×16 picture elements. Each picture element comprises a red LED, a green LED and a blue LED. The driver device 4 comprises a latch 41,42,43 for storing the sub-field-on signal 72 for each of the 256 picture elements during each subfield. The subfield-on signal indicates whether a LED of the picture element emits or does not emit radiation for an actual subfield. The output-enable signal 73 determines the on-period of the LEDs during each subfield. The brightness of the LEDs is dependent on the LED current provided by the driver device 4 and the on-period of the LEDs of the respective subfields.

In practice, the number of picture element is 512 (horizontal)×384 (vertical)×3. Consequently, several driver devices 4, data processing devices 3 and data distribution devices 2 are necessary to address the full display screen 5.

Figure 2:
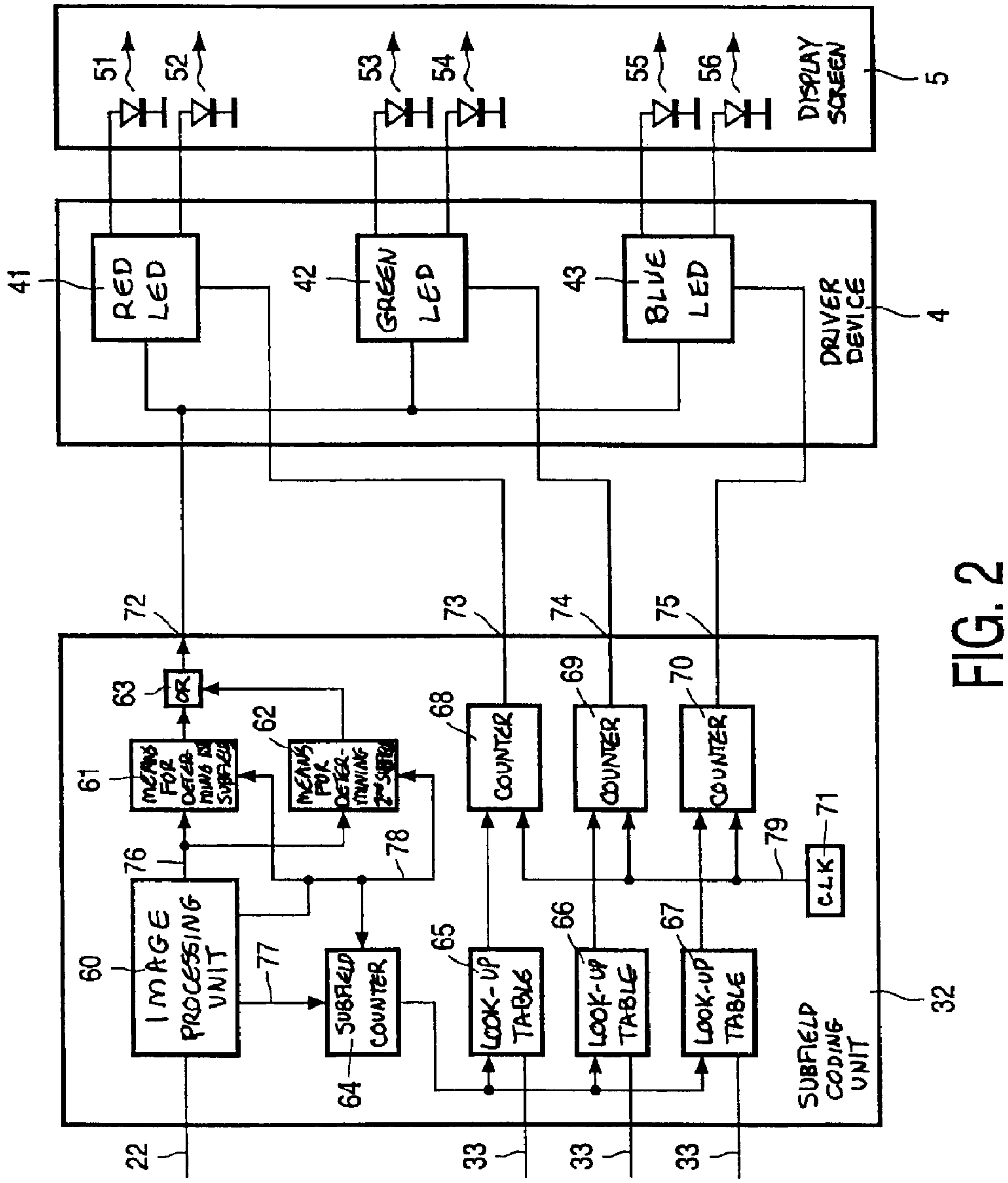
FIG. 2 shows a block diagram of a subfield coding device.

FIG. 2 shows an example of a block diagram of a subfield coding unit 32 for use in the data processing device 3. The subfield coding unit 32 comprises an image processing unit 60, a subfield counter 64, look-up tables 65,66,67, period counters 68,69,70 and a clock circuit 71. Furthermore, the driver device 4 and a portion of the display screen 5 with two LEDs (51,52;53,54;55,56) per colour are shown. In the subfield coding unit 32, the subfield counter 64 is connected to the image processing unit 60. In this example, the image processing unit 60 determines an eighteen-bit digital value from the eight-bit video data. Furthermore, 256 subfields are applied for the subfield coding of the display device 6. The length of each of the subfields is fixed. The first ten subfields have a different duration of the on-period, the remaining 245 subfields have a fixed on-period. The duration of an on-period of one of the first ten subsequent subfields is a function of the rank of a selected bit in the sequence of the ten least significant bits. The values of these ten respective least significant bits of the eighteen-bit digital value are used to determine whether the LED emits or does not emit radiation in one of the first ten subsequent subfields, which order corresponds to the order of the bit in the sequence. The subfield coding unit 32 comprises means 61 for determining the first number of subfields that emit radiation. Preferably, said means 61 determines in which of the ten first subsequent subfields the LED emits radiation from the value of ten respective least significant bits of the eighteen-bit digital value. A first number of subfields having a different on-period is thus determined.

Furthermore, the subfield coding device 32 comprises means 62 for determining the second number of subfields having a fixed on-period from the remaining eight most significant bits of the eighteen-bit digital value. The second number of subfields is determined by the value formed by the eight most significant remaining bits of the digital value. The second number equals the number of remaining subfields wherein the LED emits radiation for the whole duration of the subfield. In this example, the second number is a maximum of 245 subfields. In this way, the means for determining the second number of subfields determines the second number of subfields having a fixed period wherein the LED emits radiation and generates a subfield-on signal 72 for these subfields. This method of subfield coding provides a large dynamic range while the maximum brightness of the display screen is substantially maintained.

Both means 61, 62 generate a subfield-on-signal 72 for the individual LEDs associated with the subfield coding device 32. The subfield-on signal 72 is sent via a logic OR circuit 63 to the driver device 4. Furthermore, the image processing unit 60 generates a subfield-count-signal 78 and a frame-reset-signal 77 which indicates the beginning of a new frame. The subfield counter 64 counts the number of subfields from the subfield-count signal 78 and is reset to zero when the frame-reset-signal 77 is received. An output of the subfield counter 64 is connected to an input of the look-up tables 65,66,67. Look-up tables 65,66,67 and period counters 68,69,70 are present for each colour. The outputs of the respective look-up tables 65,66,67 are connected to the respective period counters 68,69,70 for loading a digital number in the respective period counter. The period counters 68,69,70 generate the output-enable signals 73,74,75 for the respective red, green and blue LED drivers 41,42,43 in dependence upon the loaded digital number and a clock signal 79. After receiving the frame-reset signal 77, the subfield counter 64 counts the consecutive subfields. Preferably, the clock signal 79 has a clock frequency of 10 Mhz to obtain a sufficiently low output of the LEDs under low ambient light conditions for PAL TV images. The clock circuit 71 generates the clock signal 79. Furthermore, the subfield counter 64 and the period counters 68,69,70 should be reset with the frame-reset signal to avoid unwanted interference when the display screen 50 is being filmed. The output-enable signals 73,74,75 and the subfield-on signal 72 are sent to the screen driver 4 and stored in latches 41,42,43 having outputs connected to the LEDs 51,52,53,54,55,56.

The digital numbers for the look-up tables 65,66,67 can be determined as follows. For a PAL TV image, each field is 20 ms, when the field is divided into 256 subfields. Each subfield takes 78.125 microseconds and the number 782 corresponds to the maximum number of clock periods defining the maximum length of the period wherein the LED emits radiation in that subfield. For an NTSC TV image, each field is 17 ms, when the field is divided into 256 subfields. Each subfield takes 65 microseconds and the decimal number 651 corresponds to the maximum number of clock periods defining the maximum length of the period wherein the LED emits radiation in that subfield. In this example, the look-up table has a table of 256 entries corresponding to the number of applied subfields and a 10-bit output for coding 782 different lengths varying from 1 to 782 clock periods defining the on-period in which the LED emits radiation in an associated subfield.

An example of a look-up table comprising the decimal numbers for the period counters 68,69,70 is shown in Table 1.

TABLE 1

| | |
|---|---|
| 0 | 2 |
| 1 | 2 |
| 2 | 3 |
| 3 | 6 |
| 4 | 12 |
| 5 | 24 |
| 6 | 49 |
| 7 | 97 |
| 8 | 195 |
| 9 | 391 |
| 10 | 782 |
| . . . | 782 |
| 255 | 782 |

In the Table, the minimal on-period for the LED is limited to at least 2 counts for practical reasons.

In operation, the image processing unit 60 converts the 8-bit digital video data Iin into a 18-bit number value Iout via a gamma correction. For example, the gamma correction is represented by the function Iout=(Iin)^gamma*(Max/MaxIin^gamma), wherein Gamma=2.2, Max represents a maximum eighteen-bit value and MaxIin represents the maximal value of the video data.

The first eight most significant bits of the value Max are determined by the decimal number 245 and the ten least significant bits of the value Max are determined by the decimal number 1023. This eighteen-bit binary value Max represents the decimal value 251903.

Furthermore, the values for the look-up table 65,66,67 may include this gamma correction. The values for the look-up table may also include other non-linear image processing functions to compensate for a non-linear brightness scale.

Furthermore, the look-up tables 65,66,67 may be equal to each other. In order to provide a white point correction to obtain a desired colour balance between the red, green and blue, the values in the different look-up tables can be altered.

Furthermore, the look-up tables 65,66,67 can be loaded with pre-stored data, but alternatively it is also possible to load new tables in the look-up table via an external computer and the control bus 15.

It should be noted that the above-mentioned embodiments illustrate rather than limit the invention, and that those skilled in the art will be able to design many alternative solutions without departing from the scope of the claims. In the claims enumerating several means, several of these means can be embodied by one and the same item of hardware. The invention is preferably applied in large-screen LED displays for outdoor use and other matrix displays (digital micro-mirrored device, plasma display panel (PDP)) but may also be applied with other devices such as O-LED display devices in mobile telephones.

I claim:

1. A device for subfield coding video data for a large-screen display, the device comprising:

means for receiving n-bit video data for a picture element of the display and for generating, from the n-bit video data, an in-bit digital value for the picture element, where m>n; and means for determining, from the digital value, a first number and a second number of subfields of a predetermined total number of subfields for which determined subfields the picture element emits radiation, wherein the first number of subfields all have a same total duration, and at least two of which have a different on-period duration in which the picture element emits radiation, and wherein the second number of subfields all have a same total duration and a same on-period duration during which the picture element emits radiation.

2. The device of claim 1, wherein the means for determining the first number are arranged to determine the first number from a sequence of a predetermined number of least significant bits of the digital value.

3. The device of claim 2, wherein the subfield coding device comprises means for generating a subfield sequence having a number of subfields which is equal to the determined number of least significant bits, and the duration of the on-period of a subfield selected from the subfield sequence is a function of two to the power of the rank of the selected subfield in the subfield sequence.

4. The device of claim 3, wherein the subfield coding device comprises means for generating an output-enable signal depending on the order of a subfield in the subfield sequence and the value of a bit in the sequence of least significant bits, which order of the bit in the sequence corresponds to the order of the subfield.

5. The device of claim 4, wherein the means for generating the output-enable signal comprises a look-up table and a period counter for counting the length of the on-period.

6. The device of claim 1, wherein the means for determining the second number are arranged to determine the second number proportional to a value formed by the remainder of most significant bits of the digital value.

7. A display device comprising a display screen having a plurality of controllable light sources arranged in a matrix, the display device comprising a device for subfield coding as claimed in claim 1.

8. A method of subfield coding a large-screen display, the method comprising:

receiving n-bit video data for a picture element of the display;

generating, from the n-bit video data, an in-bit digital value for the picture element, where m>n; and determining, from the digital value, a first number and a second number of subfields of a predetermined total number of subfields, for which determined subfields the picture element emits wherein the first number of subfields all have a same total duration and at least two of which have a different on-period duration in which the picture element emits radiation, and wherein the second number of subfields all have a same total duration and a same on-period duration during which the picture element emits radiation.

9. The method of claim 8, further comprising:

determining the first number from a sequence of a predetermined number of least significant bits of the digital value;

generating a subfield sequence having a number of subfields which is equal to the determined number of least significant bits, where the duration of the on-period of a subfield selected from the subfield sequence is a function of two to the power of the rank of the selected subfield in the subfield sequence; and generating an output-enable signal depending on the order of a subfield in the subfield sequence and the value of a bit in the sequence of least significant bits, which order of the bit in the sequence corresponds to the order of the subfield.

10. The method of claim 8, further comprising determining the second number proportional to a value formed by a remainder of most significant bits of the digital value.

11. The method of claim 8, wherein generating the m-bit digital value ($I_{out}$) for the picture element from the n-bit video data ($I_{in}$) includes applying a gamma correction function to the video data:

$$I_{out}=(I_{in})^{gamma}*(Max/Max_{in}^{gamma}),$$

where Max represents a maximum m-bit value, and $Max_{in}$ represents a maximum n-bit value.

12. The device of claim 1, further comprising a look-up table storing a number corresponding to an on-period for each of the first number of subfields and the second number of subfields.

13. The device of claim 1, wherein the means for generating the m-bit digital value ($I_{out}$) for the picture element from the n-bit video data ($I_{in}$) includes means for applying a gamma correction function to the video data:

$$I_{out}=(I_{in})^{gamma}*(Max/Max_{in}^{gamma}),$$

where Max represents a maximum m-bit value, and $Max_{in}$ represents a maximum n-bit value.

14. An apparatus for coding video data for a display device comprising a plurality of picture elements, the apparatus comprising:

an image processing unit adapted to receive n-bit video data and to generate therefrom an m-bit value for a picture element of the display, where m>n;

means for determining for which ones of a first group of subfields the picture element emits radiation, on-period durations of at least two of the first group of subfields being different from each other; and means for determining for which ones of a second group subfields the picture element emits radiation, on-period durations of all of the second group of subfields being the same as each other.

15. The apparatus of claim 14, wherein the means for generating the m-bit digital value ($I_{out}$) for the picture element from the n-bit video data ($I_{in}$) includes means for applying a gamma correction function to the video data:

$$I_{out}=(I_{in})^{gamma}*(Max/Max_{in}^{gamma}),$$

where Max represents a maximum m-bit value, and $Max_{in}$ represents a maximum n-bit value.

16. The apparatus of claim 14, where the second group of subfields comprises n subfields and the first group of subfields comprises (m-n) subfields.

17. The apparatus of claim 14, wherein the means for determining for which ones of the first group of subfields the picture element emits radiation and the means for determining for which ones of the second group of subfields the picture element emits radiation, operate to generate a subfield-on signal for the picture element indicating for which of the first and second groups of subfields the picture element emits radiation, and further comprising:

means for generating an output-enable signal for each of the subfields indicating an on-period of each subfield; and a latch responsive to both the subfield-on signal and the output-enable signal to control when the picture element emits radiation.

18. The apparatus of claim 17, wherein the means for generating an output-enable signal for each of the subfields indicating an on-period of each subfield comprises a look-up table and a period counter for counting the length of the on-period in response to a clock signal.

* * * * *